United States Patent Office 3,712,936
Patented Jan. 23, 1973

3,712,936
ALKYL CARBAMOYL-N,N-DIALKYL-
PHOSPHONAMIDATES
Arthur G. Jelinek, Wilmington, Del., assignor to E. I. du
Pont de Nemours and Company, Wilmington, Del.
No Drawing. Filed Oct. 8, 1970, Ser. No. 79,252
Int. Cl. C07f 9/24; A01n 9/36
U.S. Cl. 260—943   3 Claims

ABSTRACT OF THE DISCLOSURE

The disclosure teaches the preparation of a novel group of alkyl carbamoyl-N,N-dialkylphosphonamidates which are useful to retard the growth of plants or to increase the sugar content of sugar-containing plants.

The alkyl carbamoyl-N,N-dialkylphosphonamidates are prepared as follows:

An appropriate amine is reacted with a dialkylchlorophosphite. The product is treated with a suitable chloroformate followed by treatment with ammonia.

SUMMARY OF THE INVENTION

This invention relates to a novel group of carbamoylphosphonamidates, the method of using the carbamoylphosphonamidates to modify plant growth patterns and formulations containing the carbamoylphosphonamidates which are useful in plant modification applications.

The compounds of this invention are represented by the following formula:

(1)

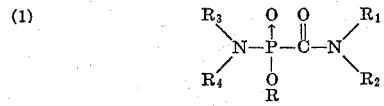

where

R is alkyl of from one to eight carbon atoms, chloroalkyl of from one to eight carbon atoms containing up to three chlorine atoms, bromoalkyl of from one to eight carbon atoms containing up to three bromine atoms, alkoxyalkyl of from three to ten carbon atoms, alkenyl of from two to eight carbon atoms, alkynyl of from three to four carbon atoms, phenyl or benzyl;

$R_1$ is hydrogen, alkyl of one to four carbon atoms, hydroxyalkyl of two to four carbon atoms, alkenyl of three to four carbon atoms, or alkynyl of three to four carbon atoms;

$R_2$ is hydrogen, alkyl of one to four carbon atoms, hydroxyalkyl of two to four carbon atoms, alkenyl of three to four carbon atoms, or alkynyl of three to four carbon atoms; or $R_1$ and $R_2$ can be taken together to form a bridge consisting of

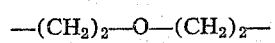

or $(CH_2)_n$ where $n$ is 4, 5, or 6; and one of $R_1$ and $R_2$ can be

where $R_5$ and $R_6$ are the same or different and are hydrogen or alkyl of one through four carbon atoms; $R_3$ is hydrogen, alkyl of one to four carbon atoms or alkenyl of three to four carbon atoms; and $R_4$ is hydrogen, alkyl of one to four carbon atoms or alkenyl of three to four carbon atoms.

Of the above compounds of Formula 1, those compounds where R is alkyl of one to four carbon atoms or alkenyl of two to four carbon atoms, $R_1$ and $R_2$ are each hydrogen and $R_3$ and $R_4$ are each hydrogen or alkyl of one to four carbon atoms are preferred because of their outstanding activity.

This invention also relates to the method of modifying the growth rate of plants which comprises applying an effective amount of a compound of Formula 1 to a plant to effect modification of the growth of said plant. One aspect of said growth modification method relates to the retardation of the growth rate of treated plants, especially that of woody vegetation. Another aspect of said growth modification method relates to the ability of the compounds of Formula 1 to increase the sugar content of a sugar-containing crop.

This invention further relates to agricultural formulations consisting of a compound of Formula 1 in combination with suitable agricultural adjuvants and modifiers.

DESCRIPTION OF THE INVENTION

This invention is founded on the discovery that the compounds of Formula 1 are useful for modifying the growth rate of plants. In this regard, it has been noted that the compounds of this invention, as represented by Formula 1, are particularly useful to retard the growth rate of plants without killing them. The compounds of this invention are particularly useful to retard the growth of woody plants. The compounds of this invention can, therefore, be applied in areas such as power line rights-of-way where low-growing and slow growing vegetation is especially desirable.

In addition to their value as plant growth retardants, the compounds of Formula 1 when applied to sugar-containing plants at the proper time during their growth, results in a surprising increase in the sugar content of the plant. For sugar cane, sugar beets and sorghum, which are grown for sucrose production, this increase in sugar content is observed directly as an increase in the yield from a given area of cropland. With other plants, the increase is observed by analysis of the plant or by analysis of the harvested parts thereof. Obviously, increased sugar levels improve the palatability of the plant or plant parts and offer improved dietary value. While the physiological mechanism involved in this increase in sugar content is not fully understood, it is apparent that the compounds used in this invention redirect the carbohydrate metabolism of the plant in such a way as to increase the sugar level in the plant juices. In addition, the treatment results in an increase in juice purity and a decrease in the extraneous matter that must be handled at the mill when the sugar cane is harvested, resulting in a more efficient and economical milling of the crop. Similar benefits are observed in treatment of sugar beets and syrup sorghum with the compounds of Formula 1.

In addition to the above, the compounds of this invention can also be used to control flowering, fruit set and coloration on apples and other fruits. They are useful to control the growth and flowering of ornamental species such as chrysanthemum and azalea.

The compounds of this invention can also be used to prolong the dormancy of perennial plants, and thereby protect the unsprouted buds from frost damage. This can be especially important in the protection of flower buds, which in some years may sprout early and be killed by cold temperatures.

Preparation

The carbamoylphosphonamidates of this invention are readily prepared by the interaction of an appropriate amine with a halogenated phosphite followed by treatment with an appropriate halogenated carboxylic acid ester and then ammonia or an amine.

These reactions can be represented as follows:

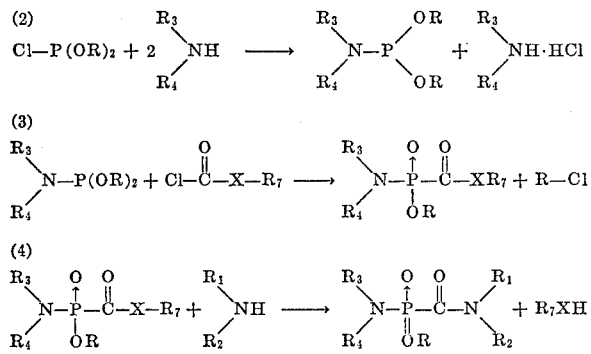

In the above equations, R, $R_1$, $R_2$, $R_3$ and $R_4$ are defined as above. $R_7$ is lower alkyl, preferably methyl or ethyl. X is oxygen or sulfur. Normally, X will be oxygen in the above described reaction, however, when the amine in Equation 4 has relatively low reactivity, X is preferably sulfur. More information relative to the reaction when X is sulfur can be had by reviewing the disclosure of U.S. Pat. No. 3,005,010.

The starting materials of Equation 2, above, are commerically available or can be readily prepared using methods known to the art. The reaction of Equation 2 is run at approximately 0° C. and involves a slow addition of the amine to a solution of the dialkyl chlorophosphite in an inert solvent. Suitable solvents include ethers, hydrocarbons or chlorinated hydrocarbons.

The phosphoramidite ester intermediates are generally liquids and may be purified by distillation under reduced pressure after removal of the amine hydrochloride by-product and the solvent. Illustrative of the dialkyl chlorophosphite esters which can be employed in the reaction are dimethyl chlorophosphite, diethyl chlorophosphite, diallyl chlorophosphite, bis-(2-chloroethyl) chlorophosphite, and dioctyl chlorophosphite.

Illustrative of the amines useful in the above reaction are methylamine, diethylamine, diallylamine, butylamine and isopropylamine.

In the procedure outlined in reaction 3 the phosphoramidite ester is treated with a chloroformate or chlorothiolformate at a temperature of from −10° C. to 100° C. In this reaction, a solvent is not necessary, although one can be used if desired and when a solvent is used that solvent should be inert to the reactants employed. Solvents suitable for use in this reaction include ethers and hydrocarbons. The carbonylphosphonamidate ester intermediates generally are liquid products. Many times, it is not necessary to purify them further after removal of the by-product alkylhalide, however, if necessary, purification can be carried out by distillation at reduced pressure. Illustrative of the acid chlorides employed in the above reaction are methyl chloroformate, ethyl chloroformate, methyl chlorothiolformate and ethyl chlorothiolformate.

Illustrative of the phosphoramidite ester intermediates which can be used as a starting material in reaction 3 are dimethyl N-methylphosphoramidites, diphenyl N-methylphosphoramidite, diethyl N,N-diethylphosphoramidite, dimethyl N,N-dipropylphosphoramidite and bis(2-chloroethyl) N,N-dimethylphosphoramidite. The procedure of reaction 4 is conducted at a temperature of from 0° C. to 25° C. The reaction can be run with or without a solvent present. Suitable solvents include water, ethers, hydrocarbons or chlorinated hydrocarbons. Illustrative of the amines which can be employed in reaction 4 are methylamine, dimethylamine, ethylamine, allylamine, 1,1-dimethylhydrazine, morpholine and pyrrolidine.

Illustrative of the carbonyl phosphonamidate ester intermediates which can be employed in reaction 4 are allyl methoxycarbonyl-N-methylphosphonamidate, methyl methoxycarbonyl-N,N-dimethylphosphonamidate, ethyl methoxycarbonyl - N,N - diethylphosphonamidate, 2-chloroethyl ethoxycarbonyl - N,N - dimethylphosphonamidate, butyl methoxycarbonyl-N,N-diethylphosphonamidate, isopropyl methoxycarbonyl-N,N-dimethylphosphonamidate and octyl methoxycarbonyl-N,N-dimethylphosphonamidate.

The following are illustrative of the carbamoylphosphonamidates of this invention:

Ethyl carbamoyl-N,N-diethylphosphonamidate
Allyl carbamoyl-N,N-dimethylphosphonamidate
Ethyl carbamoyl-N,N-dimethylphosphonamidate
2-chloroethyl carbamoyl-N,N-diethylphosphonamidate
Methyl carbamoyl-N,N-diallylphosphonamidate
Isopropyl dimethylaminocarbamoyl-N,N-dimethylphosphonamidate
Ethyl methylcarbamoyl-N-methylphosphonamidate The compounds of Formula 1 generally are liquids, but some are solids. In general, the compounds prepared according to the methods described above are acceptable for use as plant growth regulants after removal of the by-product alcohol and solvent, although if further purification is desired, the solid products can be recrystallized from an appropriate solvent and those products of this invention which are liquid can be distilled under high vacuum.

Those compounds of Formula 1 containing short-chain substituents in general have good solubility in water, lower alcohols and ketones. Those compounds of Formula 1 with longer chain substituents exhibit decreased solubility in water, but have increased solubility in most organic solvents. The differences in physical properties can be employed to advantage in the preparation of various types of agricultural formulations as will be illustrated below.

The following examples are presented to further illustrate this invention. In the examples, parts and percentages are by weight unless otherwise specified.

EXAMPLE 1

One hundred parts of diethyl chlorophosphite are dissolved in 640 parts of anhydrous diethyl ether and treated slowly with 102 parts of diethylamine with the reaction temperature maintained at 0° C. After stirring an additional hour at 0° C., the mixture is warmed to 25° C. and the diethylamine hydrochloride is removed by filtration. Evaporation of the solvent and distillation of the residue affords 85 parts of diethyl N,N-diethylphosphonamidate, B.P. 69–73°/9.2 mm.

Eighty-five parts of the above liquid are cooled to −10° C. and treated dropwise with 42 parts of methyl chloroformate over a three-hour period. The mixture is slowly warmed to 100° C. The temperature is maintained until gas evolution ceases. Distillation of the mixture gives 55.4 parts of ethyl methoxycarbonyl-N,N-diethylphosphonamidate, B.P. 90–92°/0.5 mm.

Ten parts of the above liquid are treated with 18 parts of a 29% solution of ammonia in water at 0°. After 30 minutes the solution is evaporated under reduced pressure affording 8 parts of essentially pure ethyl carbamoyl-N,N-diethylphosphoramidite, M.P. 98–101° C.

EXAMPLES 2–44

The procedure of Example 1 is repeated, substituting a stoichiometric quantity of the indicated "Dialkyl chlorophosphite," the "First Amine" and the "Second Amine" to produce the "Carbamoyl Product." Alternatively, the methyl chloroformate can be replaced by a stoichiometric quantity of methyl chlorothiolformate when it is advantageous to do so.

| Ex. | Dialkyl chlorophosphite | First amine | Second amine | Carbamoyl product |
|---|---|---|---|---|
| 2 | Dioctyl chlorophosphite | Dimethylamine | Ammonia | Octyl carbamoyl-N,N-dimethylphosphonamidate. |
| 3 | Bis[4-(2-chloro)octyl] chlorophosphite | Methylamine | do | 4-(2-chloro)octyl carbamoyl-N-methylphosphonamidate. |
| 4 | Bis[4-(1,2,3-trichloro)octyl] chlorophosphite | do | do | 4-(1,2,3-trichloro)octyl carbamoyl-N-methylphosphonamidate. |
| 5 | Dipropargyl chlorophosphite | Dimethylamine | do | Propargyl carbamoyl-N,N-dimethylphosphonamidate. |
| 6 | Dimethyl chlorophosphite | Diethylamine | Butylamine | Methyl butylcarbamoyl-N,N-diethylphosphonamidate. |
| 7 | Bis[4-(2-bromo)octyl] chlorophosphite | do | Ammonia | 4-(2-bromo)octyl carbamoyl-N,N-diethylphosphonamidate. |
| 8 | Bis[4-(1,2,3-tribromo)octyl] chlorophosphite | do | do | 4-(1,2,3-tribromo)octyl carbamoyl-N,N-diethylphosphonamidate. |
| 9 | Bis(2-chloroethyl)chlorophosphite | do | Methylamine | 2-chloroethyl methylcarbamoyl-N,N-diethylphosphonamidate. |
| 10 | Bis(2,2,2-trichloroethyl) chlorophosphite | do | Ammonia | 2,2,2-trichloroethyl carbamoyl-N,N-diethylphosphonamidate. |
| 11 | Bis(2-chloroethyl)chlorophosphite | do | do | 2-chloroethyl carbamoyl-N,N-diethylphosphonamidate. |
| 12 | Bis(2,2,2-tribromoethyl) chlorophosphite | do | do | 2,2,2-tribromoethyl carbamoyl-N,N-diethylphosphonamidate. |
| 13 | Bis(2-methoxyethyl) chlorophosphite | Dimethylamine | do | 2-methoxyethyl carbamoyl-N,N-dimethylphosphonamidate. |
| 14 | Bis[4-(2-ethoxy)octyl] chlorophosphite | do | do | 4-(2-ethoxy)octyl carbamoyl-N,N-dimethylphosphonamidate. |
| 15 | Diallyl chlorophosphite | Diethylamine | Dimethylamine | Allyl dimethylcarbamoyl-N,N-diethylphosphonamidate. |
| 16 | Bis(4-oct-2-enyl)chlorophosphite | do | Ammonia | 4-oct-2-enyl carbamoyl-N,N-diethylphosphonamidate. |
| 17 | Bis(3-butynyl)chlorophosphite | do | do | 3-butynyl carbamoyl-N,N-diethylphosphonamidate. |
| 18 | Diphenyl chlorophosphite | Dimethylamine | do | Phenyl carbamoyl-N,N-dimethylphosphonamidate. |
| 19 | Dibenzyl chlorophosphite | do | do | Benzyl carbamoyl-N,N-dimethylphosphonamidate. |
| 20 | Diethyl chlorophosphite | Dimethylamine | Dimethylamine | Ethyl dimethylcarbamoyl-N,N-dimethylphosphonamidate. |
| 21 | do | Diethylamine | Diethanolamine | Ethyl bis(2-hydroxyethyl)carbamoyl-N,N-diethylphosphonamidate. |
| 22 | do | do | 2-aminopropanol | Ethyl 2-(1-hydroxy)propylcarbamoyl-N,N-diethylphosphonamidate. |
| 23 | do | do | Allylamine | Ethyl allylcarbamoyl-N,N-diethylphosphonamidate. |
| 24 | do | do | Methallylamine | Ethyl methallylcarbamoyl-N,N-diethylphosphonamidate. |
| 25 | do | Dimethylamine | But-2-ynylamine | Ethyl but-2-ynylcarbamoyl-N,N-dimethylphosphonamidate. |
| 26 | do | Diethylamine | Azetidine | Ethyl 1-azetidinylcarbonyl-N,N-diethylphosphonamidate. |
| 29 | do | do | Piperidine | Ethyl 1-piperidinylcarbonyl-N,N-diethylphosphonamidate. |
| 30 | Diisopropyl chlorophosphite | do | 1,1-dimethylhydrazine | Isopropyl dimethylaminocarbamoyl-N,N-diethylphosphonamidate. |
| 31 | Diethyl chlorophosphite | Dimethylamine | Butylhydrazine | Ethyl butylaminocarbamoyl-N,N-dimethylphosphonamidate. |
| 32 | do | Dibutylamine | Ammonia | Ethyl carbamoyl-N,N-dibutylphosphonamidate. |
| 33 | do | Butylamine | do | Ethyl carbamoyl-N-butylphosphonamidate. |
| 34 | do | Methylamine | Methylamine | Ethyl methylcarbamoyl-N-methylphosphonamidate. |
| 35 | Diallyl chlorophosphite | Dimethylamine | Isopropylamine | Allyl isopropylcarbamoyl-N,N-dimethylphosphonamidate. |
| 36 | Dimethyl chlorophosphite | Diallylamine | Ammonia | Methyl carbamoyl-N,N-diallylphosphonamidate. |
| 37 | Diethyl chlorophosphite | Dimethallylamine | do | Ethyl carbamoyl-N,N-dimethallylphosphonamidate. |
| 38 | Diallyl chlorophosphite | Dimethylamine | do | Allyl carbamoyl-N,N-dimethylphosphonamidate. |
| 39 | Diethyl chlorophosphite | do | do | Ethyl carbamoyl-N,N-dimethylphosphonamidate. |
| 40 | do | Butylamine | do | Methyl carbamoyl-N-butylphosphonamidate. |
| 41 | Diisopropyl chlorophosphite | Dimethylamine | Dimethylamine | Isopropyl dimethylcarbamoyl-N,N-dimethylphosphonamidate. |
| 42 | Dimethyl chlorophosphite | Diethylamine | Ammonia | Methyl carbamoyl-N,N-diethylphosphonamidate. |
| 43 | do | Dimethylamine | do | Methyl carbamoyl-N,N-dimethylphosphonamidate. |
| 44 | Diisopropyl chlorophosphite | Diethylamine | do | Isopropyl carbamoyl-N,N-diethylphosphonamidate. |

Formulation

As stated above, one aspect of this invention relates to a formulation containing a compound of Formula 1 in combination with pest control adjuvants or modifiers to provide compositions in the form of dusts, water soluble powders, solutions, granules or pellets. In addition, other plant growth modifying agents such as maleic hydrazide and "Alar" (N-dimethylamino-succinamic acid) can be included in the compositions of this invention in combination with the compounds of this invention.

Compositions of the invention, may contain as a conditioning agent one or more surface-active agents, sometimes called surfactants, in amounts sufficient to render a given composition containing the compounds of this invention readily dispersible in water or capable of wetting foliage efficiently.

The surface-active agent used in this invention can be a wetting, dispersing or an emulsifying agent which will assist dispersion and solution of the active compound. The surface-active agent or surfactant can include such anionic, cationic and non-ionic agents as have heretofore been generally employed in plant control compositions of similar type. Suitable surface-active agents are set forth, for example, in "Detergents and Emulsifiers" 1968 Annual by John W. McCutcheon, Inc.

In general, less than 10% by weight of the surface-active agent will be used in compositions of this invention and ordinarily the amount of surface-active agents will range from 1–5% but may even be less than 1% by weight.

Additional surface-active agents can be added to the formulations to increase the ratio of surfactant:active ingredient up to as high as 5:1 by weight. Such compositions may have a greater effectiveness than can be expected from a consideration of the activity of the components used separately. When used at higher rates, it is preferred that the surfactant be present in the range of one-fifth to five parts surfactant for each one part of active agent.

Water-soluble powders

Water-soluble powders are compositions containing the water-soluble active material, an inert solid extender which may or may not be water-soluble, and optionally one or more surfactants to provide rapid wetting and solution. A buffer, which may also function as an extender, can be present to improve formulation stability and to control the pH of the final spray solution.

The classes of extenders suitable for the water-soluble powder formulations of this invention are the natural clays, diatomaceous earth, synthetic mineral fillers derived from silica and silicate, starch, sugar, and inorganic salts. Most preferred fillers for this invention are kaolinites, attapulgite clay, montmorillonite clays, synthetic silicas, synthetic sodium alumina silicate, synthetic magnesium silicate, calcium sulfate dihydrate, and disodium hydrogen phosphate.

Suitable surfactants for use in such compositions are those listed by J. W. McCutcheon in "Detergents and Emulsifiers" 1968 Annual. Among the more preferred surfactants are the non-ionic and anionic type, and those most suitable for the preparation of the dry, soluble products of this invention are solid forms of compounds known to the art as wetters and dispersants. Occasionally a liquid, non-ionic compound classified primarily as an emulsifier may serve as both wetter and dispersant.

Most preferred wetting agents are alkylbenzene- and alkylnaphthalene-sulfonates, sulfated fatty alcohols, amines or acid amides, long-chain acid esters of sodium isethionate, esters of sodium sulfosuccinate, sulfated or sulfonated fatty acids esters, petroleum sulfonates, sulfonated vegetable oils, ethylene oxide adducts of alkyl phenols and long-chain alcohols, and their phosphate derivatives, sorbitan fatty esters and their ethylene oxide adducts, and ditertiary acetylenic glycols. Preferred dispersants are methylcellulose, polyvinyl alcohol, lignin sulfonates, polymeric akylnaphthalenesulfonates, sodium naphthaenesulfonates, polymethylene bisnaphthalenesulfonate, and sodium N-methyl-N-(long chain acid) taurates.

Wetting and dispersing agents in water-soluble compositions of this invention are usually present at concentrations up to about 5 weight percent. The inert extender then completes the formulation. Where needed, 0.1 weight percent to 1.0 weight percent of the extender may be replaced by a corrosion inhibitor or an anti-foaming agent or both.

Thus, water-soluble formulations of the invention will contain from about 25 to 95 weight percent active material, from 0 to 2.0 weight percent wetting agent, from 0 to 5.0 weight percent dispersant, and from 0 to 75 weight percent inert extender, as these terms are described above.

When the water-soluble powder contains a corrosion inhibitor or an anti-foaming agent or both, the corrosion inhibitor will not exceed about 1 percent of the composition, and the anti-foaming agent will not exceed about 0.5 percent by weight of the composition, both replacing equivalent amounts of the inert extender.

It will be understood that the compounds of Formula 1 vary in degree of water solubility and that in some cases, such as concentrate spraying, it may be desired to use them in aqueous systems at concentrations above their solubility limit, i.e., as partially soluble wettable powders. Such use is possible provided the product has been ground sufficiently for use in the equipment and provided the spray mixture is not held so long that crystal growth leads to inseparability. In the latter case, crystallization inhibitors, such as protective colloids, can be of some help.

Solution concentrates

The aqueous solution concentrates are prepared by mixing a water-soluble active compound of this invention with water. A portion of the water may be replaced with methanol, ethanol, isopropanol, ethylene glycol, Cellosolve or methyl Cellosolve. Surfactants and buffering agents can optionally be present.

These aqueous solution concentrates will contain from 15 to 50% of active ingredient, and from 50 to 85% water or mixture of water and hydroxylated organic solvent. Surfactants, corrosion inhibitors, buffering and anti-foam agents may also be included in which case they may replace up to 10% of the solvent system.

Dusts

Dusts are dense powder compositions which are intended for application in dry form, in accordance with the preferred compositions and methods of the invention. Dusts are characterized by their free-flowing and rapid settling properties so that they are not readily wind-borne to areas where their presence is not desired. They contain primarily an active material and a dense, free-flowing, solid extender.

Their performance is sometimes aided by the inclusion of a wetting agent, and convenience in manufacture frequently demands the inclusion of an inert, adsorptive grinding aid. For the dust compositions of this invention, the inert extender may be either of vegetable or mineral origin, the wetting agent is preferably anionic or non-ionic and suitable adsorptive grinding aids are of mineral origin.

Suitable classes of inert solid extenders for use in the dust compositions are those organic or inorganic powders which possess high bulk density and are very free-flowing. They are also characterized by possessing relatively low surface areas and are poor in liquid adsorption. Suitable classes of grinding aids are natural clays, diatomaceous earths, and synthetic mineral fillers derived from silica or silicate. Among ionic and non-ionic wetting agents, the most suitable are the members of the group known to the art as wetting agents and emulsifiers. Although solid agents are preferred because of ease in incorporation some liquid non-ionic agents are also suitable in the dust formulations.

Preferred inert solid extenders for the dust of this invention are micaceous talcs, pyrophyllite, dense kaolin clays, tobacco dust and ground calcium phosphate rock such as that known as "Phosphodust," a trademark of the American Agricultural Chemical Company.

Preferred grinding aids are attapulgite clay, diatomaceous silica, synthetic fine silica and synthetic calcium and magnesium silicates. Preferred wetting agents are those previously described under water-soluble powder formulations.

The inert solid extenders in the dusts of this invention are usually present in concentrations of from about 30 to 90 weight percent of the total composition. The grinding aid will usually constitute 5 to 50 weight percent of the composition, and the wetting agent will constitute from about 0 to 1.0 weight percent of the composition. Dust compositions can also contain other surfactants such as dispersing agents in concentrations of up to about 0.5 weight percent.

The water-soluble powders described above can also be used in the preparation of dusts. While such water-soluble powders could be used directly in dust form, it is more advantageous to dilute them by blending with the dense dust diluent. In this manner, dispersing agents, corrosion inhibitors, and anti-foam agents may also be found as components of a dust.

Thus, the dust compositions of this invention will comprise about 5 to 20 weight percent active material, 5 to 50 weight percent adsorptive filler, 0 to 1.0 weight percent wetting agent, and about 30 to 90 weight percent dense, free-flowing dust diluent, as these terms are used herein. Such dust formulations can contain, in addition, minor amounts of dispersants, corrosion inhibitors, and anti-foam agents, derived from the water-soluble powders used to make the dusts.

Granules and pellets

Under some circumstances it may be advantageous to apply the compounds of this invention in the form of granules or pellets. Suitable carriers are natural clays, some pyrophyllites and vermiculites. Wetting agents of the type listed by J. W. McCutcheon in "Detergents and Emulsifiers" 1967 Annual can also be present to aid leaching of the active component.

One method of preparation suitable for both granules and pellets involves blending the active ingredient with clays, water-soluble salts, surfactants and a small amount of water. After pelleting and/or granulating, the formulation is dried prior to use. A second method suitable for the preparation of granules formulation involves spraying a solution of the active material on porous, adsorptive, preformed clay or vermiculite granules. Preformed granules of organic origin, such as corn cob, are also suitable for use by this method of preparation. Surfactants listed by McCutcheon can also be included in the spray solution. After drying, the granules are ready for application.

The preferred granules or pellets will contain about 5 to 30 weight percent of active material, about 0 to 5 weight percent wetting agent and about 65 to 95 weight percent inert mineral carrier.

Paints and dressings

While the formulations described above can be used to apply the compounds of Formula 1 to cut portions of plants, these compounds can also be included in paints and tree-wound dressing to be applied to local areas after pruning.

Thus, taking advantage of good water-solubility, they can be incorporated in various aqueous emulsions of asphalt or in water-based paints. Aerosol paint formulations can be of the water-in-oil emulsion type, usually with organic soluble propellant and film former, or may be an aqueous system propelled by inert gas.

Alternatively, the compounds may be finely divided and dispersed in organic systems such as organic solvent based paints and varnishes. It is preferred to use relatively non-polar solvents, such as aliphatic hydrocarbons, in such systems to prevent crystal growth in storage. Such formulations have the disadvantage that they must be well stirred before use to insure accurate dosing. This requires some care, as relatively low levels of active ingredient are present.

Certain compounds of Formula 1, particularly those having large organic substituents, have sufficient solubility in organic solvents to permit formulation in organic solutions for application to cut portions of plants. Thus, they may be incorporated into organic solvent based paints, lacquers, and varnishes at relatively low, but effective, levels. These may be of the type designed for aerosol or bough application. For this purpose halocarbon and aromatic hydrocarbon solvents are preferred, but other more polar solvents, such as ketones, alcohols, ethers, esters and amides can be included as cosolvents or as sole solvents.

Application

As stated earlier, this invention is founded on the discovery that the compounds of Formula 1 are useful for modifying the growth rate of plants. More particularly the compounds of this invention are useful as plant growth retardants. They also affect the flowering and fruit set of numerous plants.

The term plant growth retardant as used in this disclosure is to be understood to mean an agent which when applied to a plant or its environs will slow the growth of the plant without killing or causing extensive injury to said plant. This also includes a delaying response on bud sprouting or prolonging of the dormancy period.

The compounds of this invention can be used to retard the growth of woody vegetation. The compounds of this invention can also be used to control the growth of turf and other herbaceous vegetations.

The compounds of this invention can be applied as foliar sprays or as soil applications to retard the growth rate of such plants or to affect flowering and fruit set.

Preferably, the compounds of this invention are applied as a foliar spray to the point of runoff although lower-volume application may also be effective.

It is preferred that the application be made a short time prior to the period when maximum plant growth is anticipated, but application can also be made during the dormant stage or just after the plants have been trimmed. Or if flowering and fruit set are to be modified, the treatment is applied before, during or shortly after flowering.

It will be recognized that the rate of application is dependent upon the species to be treated and the results desired. In general, rates of from 0.25 to 20 kilograms per hectare are used although higher or lower rates can achieve the desired effect in some instances.

In yet another aspect of this invention, the compounds of this invention can be employed to increase the sugar content of sugar-containing crops by applying an effective amount of a compound of Formula 1 to such crop from two to eight weeks prior to normally scheduled harvest.

It has been discovered that the compounds of Formula 1 when applied to plants will enhance the yield of sugar when compared to untreated plots grown under the same growing conditions. The practice of this invention also increases the juice purity with a significant decrease in extraneous matter at the time of harvest which results in a more efficient and economical milling of the crop.

Generally, the compound of Formula 1 is applied to the plant during the last quarter of the period of plant growth and is timed to coincide with the development of sugar in the useful portion of the plant. In most situations this means a physiologically effective amount of the compound of Formula 1 will be applied during the period of two to eight weeks prior to the normal time of harvest.

It will be appreciated that the amount of a compound of Formula 1 that will be effective to increase the sugar content of sugar-containing crops will vary, for example, with the particular crop involved, plant density, the type of formulation and application method utilized, maturity of the crop, soil type, season of the year, prevailing weather conditions, the particular active ingredient utilized and the frequency of the application. Since many factors are involved, it is not possible to indicate generally one rate of application which is preferred or even suitable for all situations. However, effective resolution of these factors in determining the effective amount in any given situation is well within the ability of persons of ordinary skill in the art.

Usually only one application ranging from 0.25 to 20 kilograms of active per hectare is needed. Preferably the composition will be applied at a rate of from 1 to 4 kilograms of active per hectare.

It will also be appreciated that there are a number of methods that can be used for applying the active compound to the plant. Spray application being the most convenient, is therefore the most commonly used method. The compositions can be sprayed from air or ground carriers. In the application of the active compound particular attention should be given to thorough and uniform coverage of the crop treated to obtain the desired results.

The following examples are presented to further illustrate the formulation and application of the compounds of this invention. Parts and percentages in the following examples are by weight unless otherwise indicated.

EXAMPLE 45

A dust having the following formula is prepared.

|  | Percent |
|---|---|
| Ethyl carbamoyl-N,N-diethylphosphonamidate | 5.0 |
| Talc | 64.0 |
| Attapulgite | 30.0 |
| Sodium benzenesulfonate | 1.0 |

The active component is ground with the minor diluent and the surfactant to pass a 0.149 mm. screen. This material is then blended with the major diluent to form a dust composition.

The following compounds of this invention can be formulated in like manner.

Allyl carbamoyl-N,N-dimethylphosphonamidate
2-chloroethyl carbamoyl-N,N-diethylphosphonamidate
Methyl carbamoyl-N,N-diethylphosphonamidate
Isopropyl carbamoyl-N,N-diethylphosphonamidate
Methyl carbamoyl-N,N-diallylphosphonamidate Twenty kilograms of the above formulation was applied to a power line right-of-way area of approximately one hectare. Oak (Quercus spp.), Maple (Acer spp.), Sweetgum (Liquidamborstyraciflua), pine, (Pinus spp.), and locust (Robinia psedoacacia) were among the predominant woody species growing in this area. The treatment effectively retarded the growth rate of these plant species and reduced cost of maintaining a desirable slow-growing vegetation.

EXAMPLE 46

A water-soluble powder of the following formula is prepared.

| | Percent |
|---|---|
| Allyl carbamoyl-N,N-dimethylphosphonamidate | 95.0 |
| Synthetic silica | 3.5 |
| Disodium hydrogen phosphate | 1.0 |
| Dioctylsodium sulfosuccinate | 0.5 |

The above ingredients are mixed and then ground to pass a 0.42 mm. screen. The resulting formulation is water-soluble powder, with the exception of the synthetic silica conditioning agent.

The following compounds of this invention can also be formulated in like manner.

Ethyl carbamoyl-N,N-diethylphosphonamidate
2-chloroethyl carbamoyl-N,N-diethylphosphonamidate
Methyl carbamoyl-N,N-diethylphosphonamidate
Methyl carbamoyl-N,N-dimethylphosphonamidate
Isopropyl carbamoyl-N,N-diethylphosphonamidate Three kilograms of the above formulation was suspended in 400 liters of water and sprayed to an hectare of sugar cane four weeks before harvest. The treatment resulted in a significant increase in yield of sucrose when compared to a similar untreated plot. The treatment also reduced the amount of extraneous matter at the time of milling, resulting in an increase in the purity of the juice and also resulted in a more efficient and economical cost of milling the harvested crop.

EXAMPLE 47

A wettable powder of the following formula is prepared.

| | Percent |
|---|---|
| Ethyl carbamoyl-N,N-dimethylphosphonamidate | 50.0 |
| Montmorillonite | 43.0 |
| Synthetic silica | 4.0 |
| Disodium hydrogen phosphate | 1.0 |
| Sodium alkylnaphthalenesulfonate | 1.0 |
| Sodium lignin sulfonate | 1.0 |

The above ingredients are mixed and then ground to pass a 0.25 mm. screen. The active ingredient in the above formulation dissolves when the composition is added to water.

The following compounds can be formulated in like manner.

Allyl carbamoyl-N,N-dimethylphosphonamidate
2,2,2-trichloro carbamoyl-N,N-diethylphosphonamidate
Propargyl carbamoyl-N,N-dimethylphosphonamidate
Isopropyl carbamoyl-N,N-diethylphosphonamidate
Methyl carbamoyl-N,N-diethylphosphonamidate
Octyl carbamoyl-N,N-dimethylphosphonamidate Four kilograms of the above formulation was suspended in 100 liters of water and sprayed to an hectare of sugar beets eight weeks before harvest. The treatment resulted in an increase in yield of sucrose per hectare when compared to a similar untreated plot.

EXAMPLE 48

A solution of the following formula is prepared.

| | Percent |
|---|---|
| Methyl carbamoyl-N,N-diallylphosphonamidate | 24.0 |
| Disodium hydrogen phosphate | 1.0 |
| Sodium laurylsulfate | 0.5 |
| Water | 74.5 |

The above components are blended to form a homogeneous solution.

The following compounds can be formulated in like manner.

Ethyl carbamoyl-N,N-diethylphosphonamidate
2-chloroethyl methylcarbamoyl-N,N-diethylphosphonamidate
Methyl carbamoyl-N-butylphosphonamidate
Methyl butylcarbamoyl-N,N-diethylphosphonamidate
Allyl carbamoyl-N,N-dimethylphosphonamidate Ten kilograms of the above formulation was suspended in 400 liters of water and sprayed to an hectare of syrup sorghum six weeks before harvest. The treatment resulted in an increase in the yield of extractable sugar at the time of milling when compared to a similar untreated plot.

EXAMPLE 49

The following wettable powder is prepared.

| | Percent |
|---|---|
| Ethyl carbamoyl-N,N-diethylphosphonamidate | 30.0 |
| Maleic hydrazide | 20.0 |
| Synthetic silica | 2.5 |
| Montmorillonite | 45.0 |
| Sodium alkylnaphthalene sulfonate | 2.0 |
| Partially desulfonated sodium lignin sulfonate | 0.5 |

The above ingredients are blended, micropulverized to a particle size essentially below 50 microns and reblended.

The following compounds can be formulated in like manner.

Allyl carbamoyl-N,N-dimethylphosphonamidate
2-chloroethyl carbamoyl-N,N-diethylphosphonamidate
Methyl carbamoyl-N,N-diallylphosphonamidate
Isopropyl carbamoyl-N,N-diethylphosphonamidate
Propargyl carbamoyl-N,N-dimethylphosphonamidate
Octyl carbamoyl-N,N-dimethylphosphonamidate Six kilograms of the above formulation was suspended in 400 liters of water and sprayed to an hectare of tomato plants in the early fruiting stage of development. The treatment resulted in a significant increase in the number and weight of marketable fruit per hectare when compared to a similar untreated plot.

EXAMPLE 50

The following granule is prepared:

| | Percent |
|---|---|
| Ethyl carbamoyl-N,N-dibutylphosphonamidate | 10 |
| Sodium sulfate | 10 |
| Calcium lignin sulfonate | 10 |
| Montmorillonite | 35 |
| Kaolinite | 35 |

The mixture of ingredients is coarsely ground, blended with about 15% water and extruded and cut to form pellets about 3 mm. in diameter and 3 to 6 mm. long. After drying, these are crushed and sieved. The fraction passing a 0.84 mm. (USS No. 20) screen but retained on a 0.42 mm. (USS No. 40) screen is packaged for use. The oversized and undersized material is recycled.

The following compounds of the invention can also be formulated in like manner.

Ethyl carbamoyl-N,N-diethylphosphonamidate
2-chloroethyl carbamoyl-N,N-diethylphosphonamidate
Propargyl carbamoyl-N,N-diethylphosphonamidate
Methyl carbamoyl-N,N-diallylphosphonamidate
Allyl carbamoyl-N,N-dimethylphosphonamidate Ten kilograms of the above formulation was suspended in 400 liters of water and applied to an area of one hectare of turf grasses along a major highway right-of-way. Kentucky 31 Fescue (*Festuca anundinacea*), Kentucky Blue (*Poa pratensis*) and Bermuda (*Cynodon dactylon*) were among the predominant grass species growing in this area. The treatment effectively retarded the growth rate of these turf species and reduced the required maintenance cost of mowing and trimming.

EXAMPLE 51

| | Percent |
|---|---|
| Ethyl carbamoyl-N-butylphosphonamidate | 5 |
| Sodium oleate | 2 |
| Water | 48 |
| Asphalt | 45 |

The active ingredients, sodium oleate and water are combined and heated to about 90° C. Melted asphalt is then added using a high shear mixer to provide agitation and dispersion. The cooled product can be used as a tree wound dressing.

The following compounds can be formulated in like manner.

Ethyl carbamoyl-N,N-diethylphosphonamidate
2-chloroethyl methylcarbamoyl-N,N-diethylphosphonamidate
Methyl carbamoyl-N-butylphosphonamidate
Methyl butylcarbamoyl-N,N-diethylphosphonamidate
Allyl carbamoyl-N,N-dimethylphosphonamidate

EXAMPLE 52

The following formulation is suitable for aerosol packaging:

| | Percent |
|---|---|
| Methyl butylcarbamoyl - N,N - diethylphosphonamidate | 2 |
| Chloroform | 50 |
| Asphalt | 25 |
| Trichlorofluoromethane | 7 |
| Dichlorodifluoromethane | 21 |

A solution of active ingredient and asphalt in chloroform is first prepared and the fluorocarbon propellant system then added under pressure. The finished solution is packaged in aerosol containers for use.

The following compounds can be formulated in like manner.

Ethyl carbamoyl-N,N-diethylphosphonamidate
Octyl carbamoyl-N,N-dimethylphosphonamidate
Propargyl carbamoyl-N,N-dimethylphosphonamidate
2,2,2-trichloroethyl carbamoyl - N,N - diethylphosphonamidate
Ethyl 1-morpholinylcarbonyl - N,N - dimethylphosphonamidate

What is claimed is:

1. A compound of the formula

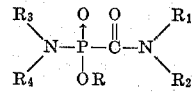

where
R is alkyl of one to four carbon atoms or alkenyl of two to four carbon atoms,
$R_1$ is hydrogen;
$R_2$ is hydrogen;
$R_3$ is hydrogen or alkyl of one to four carbon atoms; and
$R_4$ is hydrogen or alkyl of one to four carbon atoms.

2. A compound of claim 1 selected from the group consisting of ethyl carbamoyl-N,N-diethylphosphonamidate; allyl carbamoyl-N,N-dimethylphosphonamidate; and ethyl carbamoyl-N,N-dimethylphosphonamidate.

3. The compound of claim 1 which is ethyl carbamoyl-N,N-diethylphosphonamidate.

References Cited

FOREIGN PATENTS 1,316,042  12/1962  France  260—943

LEWIS GOTTS, Primary Examiner
A. H. SUTTO, Assistant Examiner

U.S. Cl. X.R.

71—76, 86; 260—239 EP, 247.2 A, 293.88, 326.8